United States Patent

Umeda et al.

[11] Patent Number: 6,069,463
[45] Date of Patent: May 30, 2000

[54] CONTROLLER OF MULTI-AXIS ROBOT

[75] Inventors: Nobuhiro Umeda; Ryuichi Oguro; Masao Ojima, all of Kitakyushu, Japan

[73] Assignee: Kabushiki Kaisha Yaskawa Denki, Fukuoka, Japan

[21] Appl. No.: 08/930,448

[22] PCT Filed: Feb. 17, 1997

[86] PCT No.: PCT/JP97/00421

§ 371 Date: Sep. 29, 1997

§ 102(e) Date: Sep. 29, 1997

[87] PCT Pub. No.: WO97/31303

PCT Pub. Date: Aug. 28, 1997

[30] Foreign Application Priority Data

Feb. 20, 1996 [JP] Japan .................................. 8-032230

[51] Int. Cl.[7] .................................................. G05B 19/408
[52] U.S. Cl. .................... 318/568.22; 318/611; 318/615; 700/53; 700/63; 700/71; 901/9; 901/19
[58] Field of Search ..................... 318/560–579, 318/520–625, 629, 630; 364/148–194, 474.11, 474.12, 474.28–474.37; 901/2, 8, 9, 19, 21, 23, 24, 25; 700/28–38, 44–46, 53–55, 61–64, 71, 72, 260, 261

[56] References Cited

U.S. PATENT DOCUMENTS

| 4,816,734 | 3/1989 | Kurakake et al. | 318/615 |
|---|---|---|---|
| 4,925,312 | 5/1990 | Onaga et al. | 395/96 |
| 4,943,759 | 7/1990 | Sakamoto et al. | 395/96 |
| 5,101,148 | 3/1992 | Yamashita et al. | 318/603 |
| 5,225,757 | 7/1993 | Burke | 318/696 |
| 5,331,265 | 7/1994 | Torii et al. | 318/610 |
| 5,341,078 | 8/1994 | Torii et al. | 318/568.22 |
| 5,477,114 | 12/1995 | Yamada et al. | 318/457 |
| 5,545,957 | 8/1996 | Kubo et al. | 318/432 |
| 5,650,704 | 7/1997 | Pratt et al. | 318/623 |
| 5,767,648 | 6/1998 | Morel et al. | 318/568.1 |

FOREIGN PATENT DOCUMENTS

| 63-314606 | 12/1988 | Japan . |
|---|---|---|
| 1136216 | 5/1989 | Japan . |
| 1163808 | 6/1989 | Japan . |
| 3250307 | 11/1991 | Japan . |
| 3257602 | 11/1991 | Japan . |
| 577176 | 3/1993 | Japan . |
| 5313752 | 11/1993 | Japan . |
| 6246652 | 9/1994 | Japan . |
| 6270079 | 9/1994 | Japan . |
| 77307 | 1/1995 | Japan . |
| 7129210 | 5/1995 | Japan . |

Primary Examiner—Brian Sircus
Attorney, Agent, or Firm—Jordan and Hamburg LLP

[57] ABSTRACT

A controller is provided for a multi-axis robot having at least first and second axis assemblies, the first and second axis assemblies each having an arm, a servomotor driven by a control input and a coupling in the form of a decelerator, which includes a spring element, coupling the servomotor and the arm, the second axis assembly being disposed at an end of the arm of the first axis assembly. The controller includes the first and second axis assemblies each including torsional angle detector for detecting a torsional angle of a respective one of the couplings. A dynamic coupling calculator calculates coupling parameters of the couplings. The first and second axis assemblies each include a semi-closed loop. A processor calculates first interaction forces and second interaction forces wherein the first interaction forces are forces generated on the arm of each of the first and second axis assemblies axis by another of the first and second axis assemblies, and the second interaction forces are generated by input, included in control inputs of the servomotors, from a respective one of the semi-closed loops due to the first interaction forces of the other of the first and second axis assemblies. A correction controller calculates a correction torque for each of the first and second axis assemblies to compensate the first interaction forces and the second interaction forces and adds the correction torque to the control input of the respective one of the first and second axis assemblies.

12 Claims, 6 Drawing Sheets

| coefficient | two-shaft robot | parallel link two-shaft robot |
|---|---|---|
| $M_{LL}$ | $M_L l_{Lg}^2 + M_U l_L^2 + M_U l_{Ug}^2 + 2l_L \cdot M_U l_{Ug} \cos\theta_{IU}$ | $M_L l_{Lg}^2 + M_U l_L^2$ |
| $M_{LU}$ | $M_U l_{Ug}^2 + l_L \cdot M_U l_{Ug} \cos\theta_{IU}$ | $l_L \cdot M_U l_{Ug} \cos(\theta_{IL} - \theta_{IU})$ |
| $M_{UL}$ | $M_{LU}$ | $M_{LU}$ |
| $M_{UU}$ | $M_U l_{Ug}^2$ | $M_U l_{Ug}^2$ |

CONTROLLER OF MULTI-AXIS ROBOT

BACKGROUND OF THE INVENTION

The present invention relates to a multi-axis robot represented by an industrial robot having a dynamic interaction between mutual control axes which includes a spring element in each axis, and particularly to a controller thereof for entirely removing the interaction force produced at the top end of an arm.

In general, in an industrial robot where each axis is driven by a motor, in order to ideally reduce influences of a lack of power of the motor or a disturbance from a load side, an arm at the load side is driven through a gear such as a harmonic drive having a high reduction ratio. Consequently a dynamic interaction between the control axes does not become a problem in the prior art.

However, accuracy as demand increases for higher speed and accuracy dynamic influences which cannot be compensated for by the PI control, and disturbances which cannot be neglected even with the high reduction ratio are produced.

In order to solve these problems, a method of compensating for the disturbance by use of a disturbance estimation observer and a method of previously compensating for the disturbance based on a dynamic equation in a similar manner to a robot of a direct drive system have been reported (e.g., Japanese Patent Laid-Open No. 63-314606, Japanese Patent Laid-Open No. 6-270079, and Japanese Patent Laid-Open No. 7-7307).

When the disturbance produced at the load side is large, with the disturbance compensation observer method, sufficient improvement in accuracy cannot be expected because the dynamic property regarding the interaction or the like is not considered Also, regarding the method of previously compensating for the disturbance based on the dynamic equation, in the conventional method, the dynamic property involving interposing a gear or the interaction force including the control input calculated to operate each axis is not sufficiently considered, so that the interaction cannot be completely removed during high speed operation.

SUMMARY OF THE INVENTION

The object of the present invention is prevention, when an industrial robot including a spring element such as a decelerator in each axis is used, of interaction between mutual axes even during high speed operation.

In order to solve the above-mentioned problems in the controller of a multi-axis robot wherein an arm of each axis is driven by a servomotor through a medium of a decelerator including a spring element, the controller of the multi-axis robot of the present invention comprises means for calculating an interaction force generated on the arm side of each axis from other axis and for calculating an interaction force included in a control input of a servomotor due to a semiclosed loop independent in each axis, generated by the above-mentioned interaction force, based on a control input to a servomotor of an axis producing an interaction and of an axis receiving an interaction, and on a torsional angle produced in a decelerator of each axis, and means for calculating correction torque based on the interaction force from the other axis and the interaction force included in the control input of the servomotor so that a top end of the arm of each axis acts without producing an interaction from the other axis and for adding the correction torque to the control input and outputting it.

In the controller, a torsional angle produced in the decelerator of each axis may be represented by a value reproduced by a state observation means reproducing the state quantity through a control input of a servomotor of each axis and an actual position of the servomotor.

More specifically, the coupling of the servomotor and the arm in each axis is expressed by two inertial systems including a spring element, whereby a dynamic equation is determined to calculate an interaction force from another axis generated on the arm side in each axis and an interaction force included in a control input of each axis due to a semiclosed loop is calculated, and such correction torque for completely canceling the interaction force is added to the control input to be outputted.

According to the present invention, even in a multi-axis robot having a mechanism including a spring element such as a decelerator between a servomotor and an arm, an interaction force generated on the arm side of each axis from another axis and an interaction force included in a control input of a servomotor due to a semiclosed loop independent in each axis are calculated and interaction torque produced in each axis is corrected. Thus, even with high speed operation which produces torsional vibration in the decelerator, the interaction force can be removed, and a servomotor of each axis can be controlled as if no interaction were produced between the drive axes.

BEST MODE FOR CARRYING OUT THE INVENTION

A two-axis robot is described to simplify explanation of the present invention. In a multi-axis robot, items explained as follows regarding the two-axis robot can be extended and applied.

Figure 1:
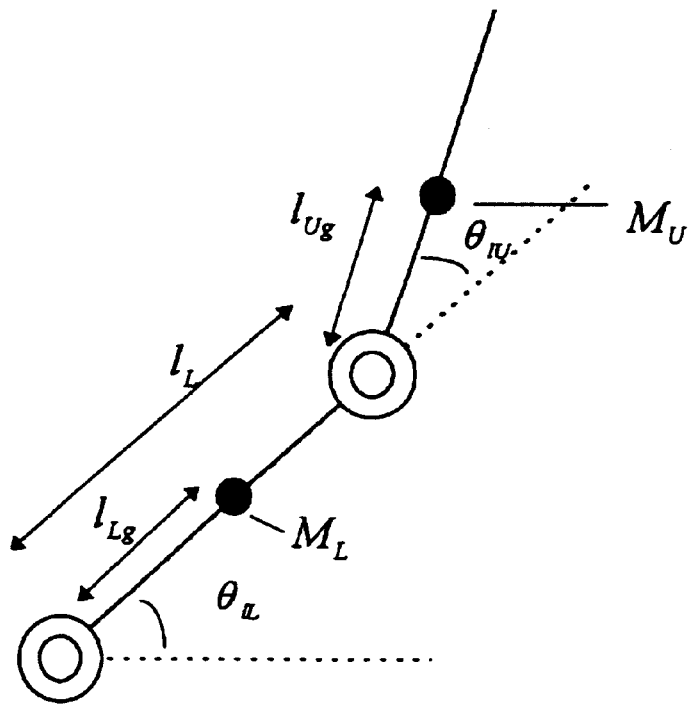
FIG. 1 is a diagrammatic view of a general vertical two-axis robot.
Figure 2:
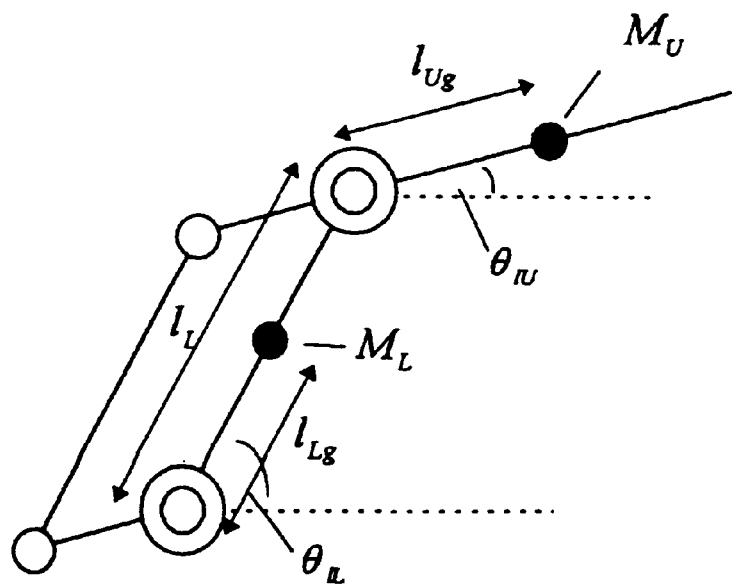
FIG. 2 is a diagrammatic view of a vertical two-axis robot of parallelogram link structure.

FIG. 1 is a diagrammatic view of a general vertical two-axis robot having an L-axis and U-axis, and FIG. 2 is a diagrammatic view of a vertical two-axis robot of parallelogram link structure. In the figures, $l_L$ is the length of the L-axis, $M_L$ is the mass of the L-axis, $l_{Lg}$ is the length of the L-axis to the center of gravity, $\theta_{lL}$ is the angle of the L-axis, $M_U$ is the mass of the U-axis, $l_{Ug}$ is the length of the U-axis to the center of gravity, and $\theta_{lU}$ is the angle of the U-axis with respect to the L-axis. An equation of motion of the two-axis robot shown in FIG. 1 and FIG. 2 can be expressed by the following formulas 1~6. First, an expression of relation representing a torsional angle produced in a decelerator of each axis is expressed in the following formulas.

$$\theta_{SL} = \frac{1}{N_L}\theta_{mL} - \theta_{iL} \quad \text{(Formula 1)}$$

$$\theta_{SU} = \frac{1}{N_U}\theta_{mU} - \theta_{iU} \quad \text{(Formula 2)}$$

Where $\theta_{mL}$ is the angle of an L-axis motor, $\theta_{mU}$ is the angle of a U-axis motor, $N_L$ is the reduction ratio of an L-axis decelerator, $N_U$ is the reduction ratio of a U-axis decelerator, $\theta_{SL}$ is the torsional angle produced in the L-axis decelerator, and $\theta_{SU}$ is the torsional angle produced in the U-axis decelerator.

Next formula 3 and formula 4 are expressions of relations determined from Lagrange's equation of motion.

$$K_{CL}\theta_{SL} = M_{LL}\theta_{iL} + M_{LU}\theta_{iU} + d_L \quad \text{(Formula 3)}$$

$$K_{CU}\theta_{SU} = M_{UL}\theta_{iL} + M_{UU}\theta_{iU} + d_U \quad \text{(Formula 4)}$$

Here, $K_{CL}$ is the spring constant of the L-axis decelerator, $K_{CU}$ is the spring constant of the U-axis decelerator, $d_L$ is the torque disturbance acting on the L-axis, and $d_U$ is the torque disturbance acting on the U-axis.

Figures 3, 4:
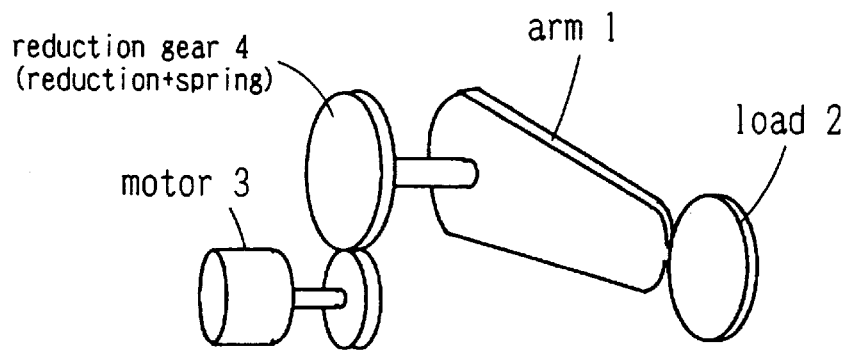
FIG. 3 is a table showing each coefficient of an equation of motion.
FIG. 4 is a simplified perspective view of a torque transmission mechanism between a motor and an arm.

FIG. 3 shows each coefficient of the equation of motion.

Furthermore, a torque transmission mechanism between a motor and an arm shown in FIG. 4 is expressed by the following formulas. In FIG. 4, numeral 1 designates an arm, numeral 2 designates a load, numeral 3 designates a motor to drive the arm 1, and numeral 4 designates a decelerator installed between the motor 3 and the arm 1. The decelerator 4 is constituted by a reduction mechanism and a spring element.

$$\theta_{mL} = -\frac{K_{CL}}{J_{mL}N_L}\theta_{SL} - u_{Lref} \quad \text{(Formula 5)}$$

$$\theta_{mU} = -\frac{K_{CU}}{J_{mU}N_U}\theta_{SU} - u_{Uref} \quad \text{(Formula 6)}$$

Here, $J_{mL}$ is the moment of inertia of the L-axis motor, $J_{mU}$ is the moment of inertia of the U-axis motor, $u_{Lref}$ is the control input of the L-axis, and $u_{Uref}$ is the control input of the U-axis. The control inputs here were represented as acceleration commands.

Figure 5:
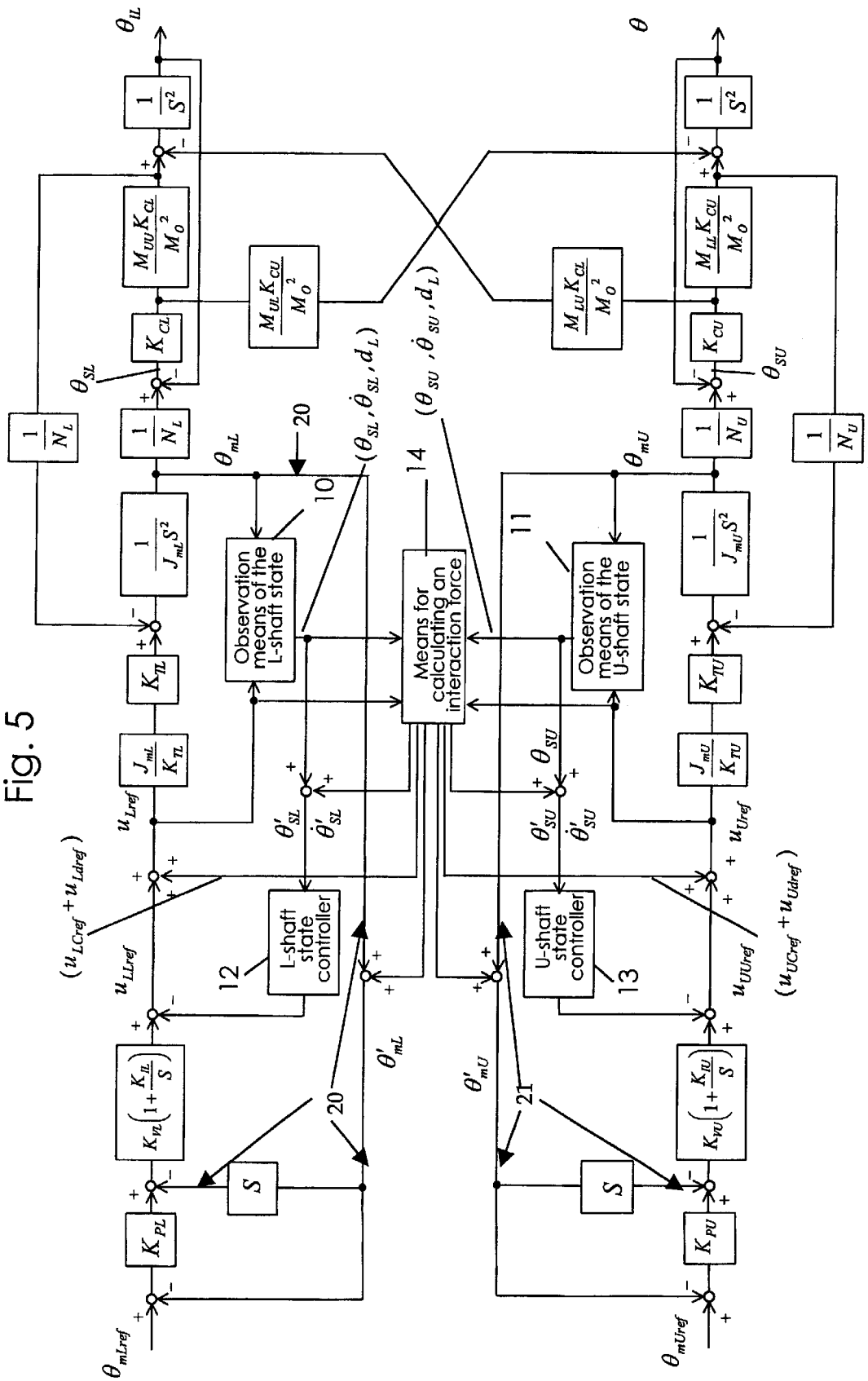
FIG. 5 is a block diagram showing a configuration of a control system of a controller of the invention for two axes.

FIG. 5 is a block a diagram of a configuration of a control system of a controller of the present invention shown regarding two axes. In FIG. 5, numeral 10 designates an observation means of the L-axis state, numeral 11 designates an observation means of the U-axis state, numeral 12 designates a controller of the L-axis state, numeral 13 designates a U-axis state controller and numeral 14 designates a means for calculating an interaction force. Reference numeral 20 denotes a semi-closed loop path for controlling the L-axis and reference numeral 21 denotes a semi-closed loop path for controlling the U-axis.

Solution of the formulas 1~6 regarding differentiation in the fourth order of the position $\theta_{iL}$, $\theta_{iU}$ of the arm 1 can be expressed as the following formulas.

$$\theta_{iL}^{(4)} = -(1 + K_{JL})\omega_{LL}^2\theta_{iL} + \frac{1}{N_L}\omega_{LL}^2 u_{Lref} - \quad \text{(Formula 7)}$$
$$K_{JL}\omega_{LL}^2\omega_{LU}^2\theta_{SU} - K_{JL}\omega_{LL}^2 d_{LL} -$$
$$d_{LL} - \omega_{LU}^2\theta_{SU}$$

$$\theta_{iU}^{(4)} = -(1 + K_{JU})\omega_{UU}^2\theta_{iU} + \frac{1}{N_U}\omega_{UU}^2 u_{Uref} - \quad \text{(Formula 8)}$$
$$K_{JU}\omega_{UU}^2\omega_{UL}^2\theta_{SL} - K_{JU}\omega_{UU}^2 d_{UU} -$$
$$d_{UU} - \omega_{UL}^2\theta_{SL}$$

where $\theta_{iL}^{(4)}$ and $\theta_{iU}^{(4)}$ are differentiation of the fourth order of $\theta_{iL}$ and $\theta_{iU}$ respectively.

$$K_{JL} = \frac{1}{J_{mL}N_L^2}\frac{M_{LL}M_{UU} - M_{LU}M_{UL}}{M_{UU}}$$

$$K_{JU} = \frac{1}{J_{mU}N_U^2}\frac{M_{LL}M_{UU} - M_{LU}M_{UL}}{M_{LL}}$$

$$\omega_{LL}^2 = K_{CL}\frac{M_{UU}}{M_{LL}M_{UU} - M_{LU}M_{UL}}$$

$$\omega_{UU}^2 = K_{CU}\frac{M_{LL}}{M_{LL}M_{UU} - M_{LU}M_{UL}}$$

$$\omega_{LU}^2 = K_{CU}\frac{M_{LU}}{M_{LL}M_{UU} - M_{LU}M_{UL}}$$

$$\omega_{UL}^2 = K_{CL}\frac{M_{UL}}{M_{LL}M_{UU} - M_{LU}M_{UL}}$$

$$d_{LL} = \frac{M_{UU}}{M_{LL}M_{UU} - M_{LU}M_{UL}}d_L - \frac{M_{LU}}{M_{LL}M_{UU} - M_{LU}M_{UL}}d_U$$

$$d_{UU} = \frac{M_{UL}}{M_{LL}M_{UU} - M_{LU}M_{UL}}d_L + \frac{M_{LL}}{M_{LL}M_{UU} - M_{LU}M_{UL}}d_U$$

In Formulas 7 and 8, the differentiation in the fourth order of the position of the arm includes the state quantity of the other axis and the disturbance term in addition to the state quantity of the self axis and the control input.

Separation of the control input into a value calculated by a command, a value due to an interaction from another axis and a value due to disturbance other than the interaction can be expressed in the following formulas.

$$u_{Lref} = u_{LLref} + u_{LCref} + u_{Ldref} \quad \text{(Formula 9)}$$

$$u_{Uref} = u_{UUref} + u_{UCref} + u_{Udref} \quad \text{(Formula 10)}$$

Where $u_{LLref}$ and $u_{UUref}$ are control inputs necessary for operation of each axis, $u_{LCref}$ and $u_{UCref}$ are control inputs to compensate the force from interaction force from other axis, and $u_{Ldref}$ and $u_{Udref}$ are control inputs to compensate the disturbance included in the control inputs $u_{Lref}$ and $u_{Uref}$.

Here the condition of noninteraction among axes can be explained in the following formulas.

$$\theta_{iL}^{(4)} = -(1 + K_{JL})\omega_{LL}^2\theta_{iL} + \frac{1}{N_L}\omega_{LL}^2 u_{LLref} \quad \text{(Formula 11)}$$

$$\theta_{iU}^{(4)} = -(1 + K_{JU})\omega_{UU}^2\theta_{iU} + \frac{1}{N_U}\omega_{UU}^2 u_{UUref} \quad \text{(Formula 12)}$$

Consequently the following formulas must be effected.

$$u_{LCref} + u_{Ldref} = K_{JL} N_L \omega_{LU}^2 \theta_{SU} + N_L \frac{\omega_{LU}^2}{\omega_{LL}^2} \theta_{SU} + \quad \text{(Formula 13)}$$

$$K_{JL} N_L d_{LL} + N_L \frac{1}{\omega_{LL}^2} d_{LL}$$

$$u_{UCref} + u_{Udref} = K_{JU} N_U \omega_{UL}^2 \theta_{SL} + N_U \frac{\omega_{UL}^2}{\omega_{UU}^2} \theta_{SL} + \quad \text{(Formula 14)}$$

$$K_{JU} N_U d_{UU} + N_U \frac{1}{\omega_{UU}^2} d_{UU}$$

The condition of removing the interaction force for the operation of the self axis is that the control input is compensated so that Formulas 11 and 12 are effected. That is, the formulas 13 and 14 must be effected.

Here, in order to compensate for the interaction force included in the control input calculated to further operate each axis, the following formulas determined by Formulas 1~6 will be introduced.

$$\theta_{SL} = -(1 + K_{JL}) \omega_{LL}^2 \theta_{SL} + \quad \text{(Formula 15)}$$

$$\frac{1}{N_L} u_{Lref} + \omega_{LU}^2 \theta_{SU} + d_{LL}$$

$$\theta_{SU} = -(1 + K_{JU}) \omega_{UU}^2 \theta_{SU} + \quad \text{(Formula 16)}$$

$$\frac{1}{N_U} u_{Uref} + \omega_{UL}^2 \theta_{SL} + d_{UU}$$

Formulas 15 and 16 are substituted for Formulas 13 and 14, whereby the following formulas can be obtained as the compensation quantity of noninteraction.

$$u_{LCref} = \frac{\omega_{UU}^2}{\omega_{LL}^2 \omega_{UU}^2 - \omega_{LU}^2 \omega_{UL}^2} \left( \omega_{LL}^2 D_L + \frac{N_L}{N_U} \omega_{LU}^2 D_U \right) \quad \text{(Formula 17)}$$

$$u_{UCref} = \frac{\omega_{LL}^2}{\omega_{LL}^2 \omega_{UU}^2 - \omega_{LU}^2 \omega_{UL}^2} \left( \omega_{UU}^2 D_U + \frac{N_U}{N_L} \omega_{UL}^2 D_L \right) \quad \text{(Formula 18)}$$

where $$D_L = N_L \frac{\omega_{LU}^2}{\omega_{LL}^2} \left[ \frac{1}{N_U} u_{UUref} + \omega_{UL}^2 \theta_{SL} + \right.$$

$$\left. \{ K_{JL} \omega_{LL}^2 - (1 + K_{JU}) \omega_{UU}^2 \} \theta_{SU} \right] - u_{Ldref} + \frac{N_L}{N_U} \frac{\omega_{LU}^2}{\omega_{LL}^2} u_{Udref} +$$

$$K_{JL} N_L d_{LL} + N_L \frac{\omega_{LU}^2}{\omega_{LL}^2} d_{UU} + N_L \frac{1}{\omega_{LL}^2} d_{LL}$$

$$D_U = N_U \frac{\omega_{UL}^2}{\omega_{UU}^2} \left[ \frac{1}{N_L} u_{LLref} + \omega_{LU}^2 \theta_{SU} + \right.$$

$$\left. \{ K_{JU} \omega_{UU}^2 - (1 + K_{JL}) \omega_{LL}^2 \} \theta_{SL} \right] - u_{dref} + \frac{N_U}{N_L} \frac{\omega_{UL}^2}{\omega_{UU}^2} u_{Ldref} +$$

$$K_{JU} N_U d_{UU} + N_U \frac{\omega_{UL}^2}{\omega_{UU}^2} d_{LL} + N_U \frac{1}{\omega_{UU}^2} d_{UU}$$

Since the compensation quantity includes the torsion amount in the decelerator, the following correction amount is added to the state variable used in the control operation.

$$\theta'_{mL} = \theta_{mL} - N_L \frac{\omega_{LU}^2}{\omega_{LL}^2} \theta_{SU} \quad \text{(Formula 19)}$$

$$\theta'_{mU} = \theta_{mU} - N_U \frac{\omega_{UL}^2}{\omega_{UU}^2} \theta_{SL} \quad \text{(Formula 20)}$$

$$\theta'_{SL} = \theta_{SL} - \frac{\omega_{LU}^2}{\omega_{LL}^2} \theta_{SU} \quad \text{(Formula 21)}$$

$$\theta'_{SU} = \theta_{SU} - \frac{\omega_{UL}^2}{\omega_{UU}^2} \theta_{SL} \quad \text{(Formula 22)}$$

According to the controller described, above the interaction force produced by the operation of the top end of the arm of each axis and the interaction force included in the control input of each axis are subjected to noninteraction, and a response without an interaction can be obtained regarding the operation of the top end of the arm.

When the disturbance can be neglected or cannot be observed, the disturbance term in Formulas 1~22 may be omitted for the application.

Effects of the embodiments of the present invention will be described as follows.

Figure 6:
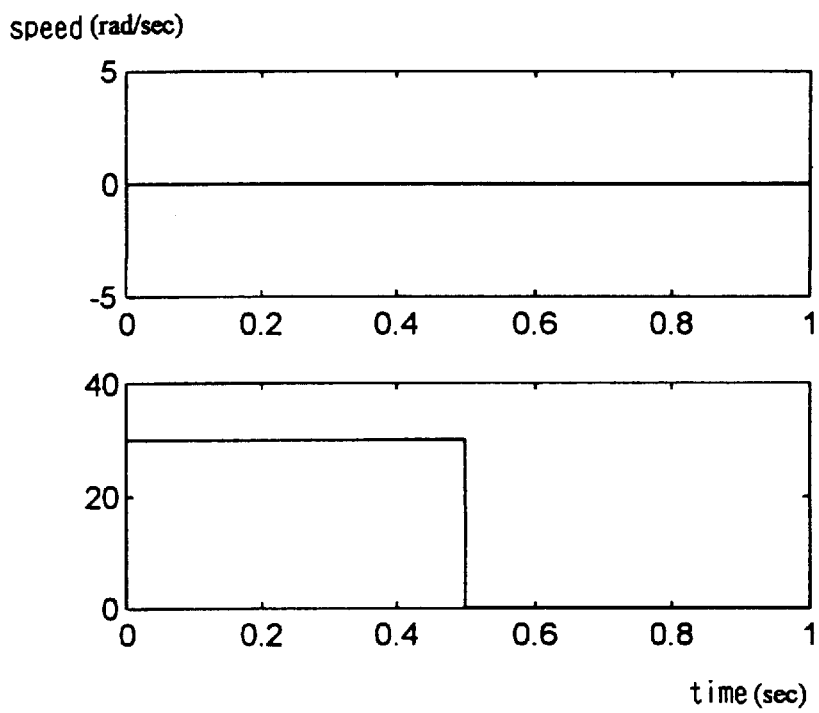
FIG. 6 is a time chart of a zero command given to a first axis and a speed command of step type given to a second axis.
Figure 7:
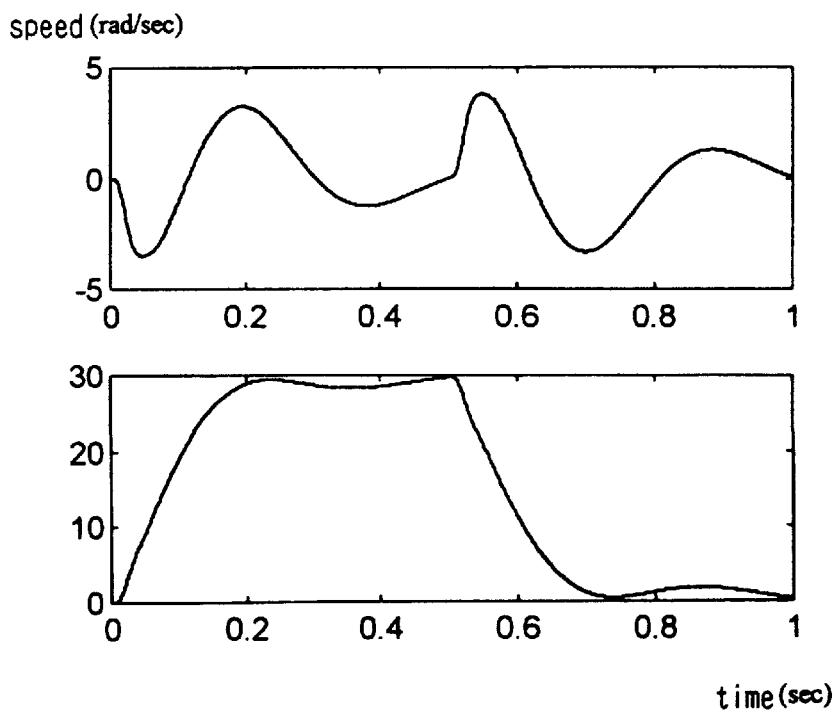
FIG. 7 is a graph of an interaction force produced in the first axis in the ordinary PI control.
Figure 8:
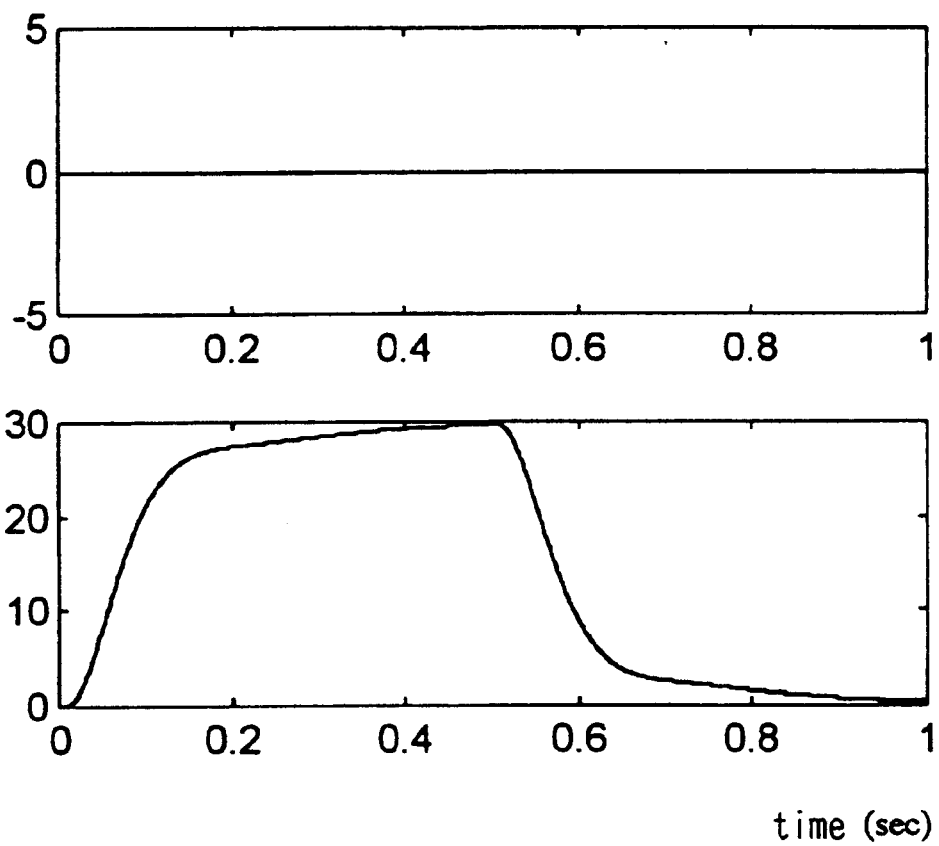
FIG. 8 is a graph showing a state wherein interaction force is removed by the invention.
Figure 9:
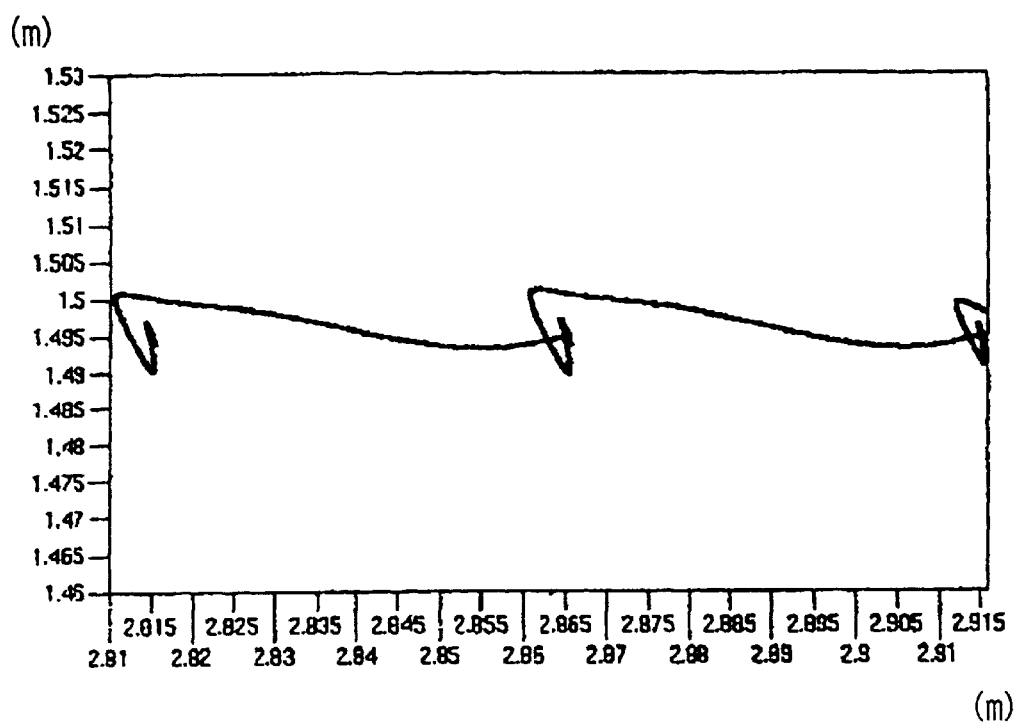
FIG. 9 is a graph showing a shift of a locus produced by ordinary PI control.
Figure 10:
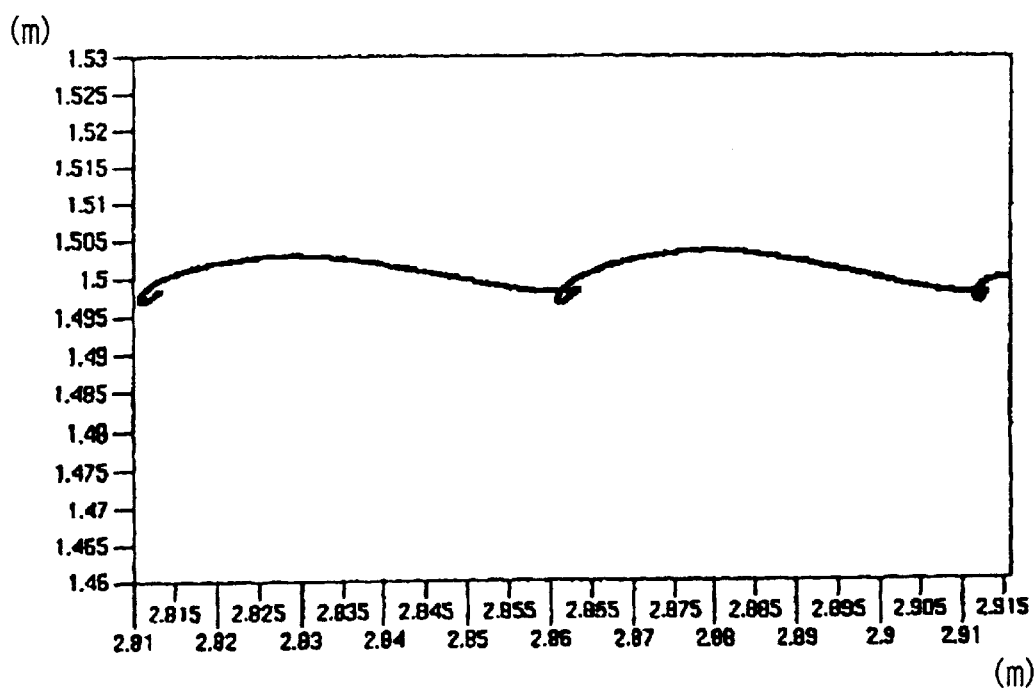
FIG. 10 is a graph showing a shift of a locus improved in the invention.

As shown in FIG. 6, when the first axis is supplied with a zero command (upper characteristics in FIG. 6) and the second axis is supplied with a speed step type command (lower characteristics in FIG. 6), in the ordinary PI control, an interaction force as shown in FIG. 7 is produced in the first axis, but using a controller of the present invention, the interaction force can be removed as shown in FIG. 8. Also when a command is issued to draw a linear locus in the horizontal direction at the top end, in the ordinary PI control, a shift is considerably produced in the locus as shown in FIG. 9, but using a controller in the present invention, the improvement can be made as shown in FIG. 10.

The present invention can be utilized in the field of control of an industrial robot including a spring element such as a decelerator in each axis.

What is claimed is:

1. A controller for a multi-axis robot having at least first and second axis assemblies, said first and second axis assemblies each having an arm, a servomotor driven by a control input and a coupling in the form of a decelerator, which includes a spring element, coupling said servomotor and said arm, said second axis assembly being disposed at an end of said arm of said first axis assembly, said controller comprising:

said first and second axis assemblies each including torsional angle detecting means for detecting a torsional angle of a respective one of the couplings;

dynamic coupling calculating means for calculating coupling parameters of the coupling of said servomotor and said arm in each of said first and second axis assemblies;

said first and second axis assemblies each including a semi-closed loop for effecting motor control;

an interaction calculator for calculating first interaction forces and second interaction forces based on control input values for said servomotors of each of said first and second axis assemblies, and said torsional angles, wherein:

said first interaction forces are forces generated on said arm of each of said first and second axis assemblies by motion of another of said first and second axis assemblies; and said second interaction forces are generated by input, included in control inputs of said servomotors, from a respective one of said semi-closed loops in each of said first and second axis assemblies due to the first interaction forces of the other of said first and second axis assemblies;

correction means for calculating a correction torque for each of said first and second axis assemblies, based on said first interaction forces and said second interaction forces for said first and second axis assemblies, to permit each of said arms to act without be affected by said first interaction forces and said second interaction forces acting on the respective one of said first and second axis assemblies, and said correction means including input means for adding the correction torque to said control input of the respective one of said first and second axis assemblies.

2. The controller according to claim 1 wherein said torsional angle detecting means of each of said first and second axis assemblies is provided with a state observation means for calculating state quantities, including said torsional angles, of a respective one of said first and second axis assemblies based on the control input and motor angle of the respective one of said first and second axis assemblies.

3. The controller according to claim 1 wherein said torsional angle detecting means of said first and second axis assemblies determine the torsional angle of the respective one of the couplings based on an input angle and an output angle of a respective one of said decelerators in accordance with the formula $$\theta_S = \frac{\theta_m}{N} - \theta_I$$

wherein $\theta_S$ is the torsion angle, $\theta_m$ is the input angle which is a motor angle, N is a reduction ratio of said decelerator, and $\theta_I$ is the output angle which is an arm angle.

4. The controller according to claim 1 wherein said torsional angle detecting means of said first and second axis assemblies detect the torsional angle of the respective one of the couplings based on the control input and motor angle $\theta_m$ of a respective one of said first and second axis assemblies.

5. The controller according to claim 1 wherein said correction means for calculates a semi-closed loop correction parameter for each of said first and second axis assemblies, based on said first interaction forces and said second interaction forces for said first and second axis assemblies, to compensate for a torsion amount included in said correction torque to permit each of said arms to act without be affected by said first interaction forces and said second interaction forces acting on the respective one of said first and second axis assemblies and adds said semi-closed loop correction parameter to a state variable of said semi-closed loop of each of said first and second axis assemblies.

6. The controller according to claim 5 wherein said state variable of said semi-closed loop of each of said first and second axis assemblies is a motor angle.

7. The controller according to claim 5 wherein said torsional angle detecting means of each of said first and second axis assemblies is provided with a state observation means for calculating state quantities, including said torsional angles, of a respective one of said first and second axis assemblies based on the control input and motor angle of the respective one of said first and second axis assemblies.

8. The controller according to claim 7 wherein said state variable of said semi-closed loop of each of said first and second axis assemblies is the motor angle.

9. The controller according to claim 5 wherein said torsional angle detecting means of said first and second axis assemblies determine the torsional angle of the respective one of the couplings based on an input angle and an output angle of a respective one of said decelerators in accordance with the formula $$\theta_S = \frac{\theta_m}{N} - \theta_I$$

wherein $\theta_S$ is the torsion angle, $\theta_m$ is the input angle which is a motor angle, N is a reduction ratio of said decelerator, and $\theta_I$ is the output angle which is an arm angle.

10. The controller according to claim 9 wherein said state variable of said semi-closed loop of each of said first and second axis assemblies is the motor angle.

11. The controller according to claim 5 wherein said torsional angle detecting means of said first and second axis assemblies detect the torsional angle of the respective one of the couplings based on the control input and motor angle $\theta_m$ of a respective one of said first and second axis assemblies.

12. The controller according to claim 11 wherein said state variable of said semi-closed loop of each of said first and second axis assemblies is the motor angle $\theta_m$.

* * * * *